(12) United States Patent
Dietsch

(10) Patent No.: US 6,305,150 B1
(45) Date of Patent: Oct. 23, 2001

(54) AIR BAG FOLDING, PROCESS AND DEVICE FOR FOLDING AIRBAGS

(75) Inventor: Andrea Dietsch, Schornsheim (DE)

(73) Assignee: Petri AG (DE)

( * ) Notice: Subject to any disclaimer, the term of this patent is extended or adjusted under 35 U.S.C. 154(b) by 0 days.

(21) Appl. No.: 09/043,055

(22) PCT Filed: Sep. 19, 1996

(86) PCT No.: PCT/DE96/01822

§ 371 Date: Dec. 29, 1998

§ 102(e) Date: Dec. 29, 1998

(87) PCT Pub. No.: WO97/12782

PCT Pub. Date: Apr. 10, 1997

(30) Foreign Application Priority Data

Sep. 22, 1995 (DE) .............................. 195 36 625
Dec. 1, 1995 (DE) .............................. 195 46 232

(51) Int. Cl.$^7$ .............................. B65B 1/24; B65B 13/20; B65B 63/02

(52) U.S. Cl. .............................. 53/529; 53/117; 53/429; 53/438; 493/250; 493/406; 493/449; 280/728.1

(58) Field of Search .............................. 53/116, 117, 429, 53/438, 528, 529; 493/243, 250, 252, 405, 406, 407, 446, 448, 449, 451, 455; 280/728.1, 731, 732, 743.1, 728.2, 728.3

(56) References Cited

U.S. PATENT DOCUMENTS

| | | | |
|---|---|---|---|
| 3,843,152 | 10/1974 | Nonaka .......................... | 280/150 AB |
| 3,876,272 | 4/1975 | Tsutsumi et al. .................. | 339/3 S |
| 3,907,330 | 9/1975 | Kondo et al. .................. | 280/150 AB |
| 4,173,356 | 11/1979 | Ross ............................. | 280/743 |
| 4,178,344 | 12/1979 | Smith et al. ..................... | 264/572 |
| 4,235,453 | 11/1980 | Lawson et al. .................. | 280/743 |
| 4,351,544 | 9/1982 | Ross ............................. | 280/743 |
| 4,718,884 | 1/1988 | Iwase et al. .................... | 493/419 |
| 4,842,300 | 6/1989 | Ziomek et al. .................. | 280/732 |
| 4,903,986 | 2/1990 | Cok et al. ..................... | 280/743 |
| 4,936,819 | 6/1990 | Sundberg ....................... | 493/451 |
| 5,022,676 | 6/1991 | Rogerson et al. ................ | 280/743 |
| 5,037,370 | 8/1991 | Sundberg ....................... | 493/451 |
| 5,114,180 | 5/1992 | Kami et al. .................... | 280/743 |

(List continued on next page.)

FOREIGN PATENT DOCUMENTS

| | | | |
|---|---|---|---|
| 2524770 | 12/1976 | (DE) .............................. | B60R/21/10 |
| 3630685 | 2/1988 | (DE) . | |
| 4138645 | 6/1992 | (DE) .............................. | B60R/21/20 |

(List continued on next page.)

OTHER PUBLICATIONS

Patent Abstracts of Japan, Publication No. 03279053, Publication Date Dec. 10, 1991, 1 page.

(List continued on next page.)

Primary Examiner—Ed Tolan
(74) Attorney, Agent, or Firm—Foley & Lardner (57) ABSTRACT

A way of folding an air bag used in an air bag module is disclosed, as well as a process and device for folding an air bag. The air bag is folded in the direction of an imaginary longitudinal axis, forming a ring with separate folds at its inner and outer sides, the imaginary longitudinal axis preferably extending through the filling mouth of the air bag. The folding process is characterized in that the empty air bag is stretched in the direction of an imaginary longitudinal axis and folded up in the direction of the longitudinal axis within a boundary, in particular a boundary having a ring-shaped cross-section. A device for folding the air bag has a molded part, at least one device for introducing the air bag into the molded part and at least one device for compressing the air bag inside the molded part. The advantage of the invention is that only a few process steps and a simple device are required for folding the air bag.

15 Claims, 6 Drawing Sheets

U.S. PATENT DOCUMENTS

| | | | |
|---|---|---|---|
| 5,140,799 | 8/1992 | Satoh | 53/429 |
| 5,162,035 | 11/1992 | Baker | 493/405 |
| 5,163,893 | 11/1992 | Hara et al. | 493/458 |
| 5,178,407 | 1/1993 | Kelley | 280/728 |
| 5,300,011 | 4/1994 | Budde et al. | 493/405 |
| 5,360,387 | 11/1994 | Baker | 493/405 |
| 5,391,137 | 2/1995 | DePoy et al. | 493/405 |
| 5,413,376 | 5/1995 | Filion et al. | 280/728 |
| 5,456,651 | 10/1995 | Baker et al. | 493/405 |
| 5,482,317 | 1/1996 | Nelsen et al. | 280/743 |
| 5,493,846 | 2/1996 | Baker et al. | 53/429 |
| 5,531,476 | 7/1996 | Kerner | 280/743 |
| 5,589,113 * | 12/1996 | Frye et al. | 264/40.5 |
| 5,609,356 * | 3/1997 | Mossi | 280/731 |
| 5,669,204 * | 9/1997 | Blaisdell | 53/429 |
| 5,690,358 | 11/1997 | Marotzke | 280/743 |
| 5,761,889 * | 6/1998 | Blaisdell et al. | 53/529 |
| 5,782,737 * | 7/1998 | Warner | 493/405 |
| 5,803,892 | 9/1998 | Marotzke | 493/451 |
| 5,960,611 * | 10/1999 | Aigner et al. | 53/429 |

FOREIGN PATENT DOCUMENTS

| | | | |
|---|---|---|---|
| 4227559 A1 | 2/1994 | (DE) . | |
| 4343026 | 6/1994 | (DE) | B60R/21/16 |
| 4422276 | 12/1994 | (DE) | B60R/21/16 |
| 195 16 494 | 2/1995 | (DE) | B60R/21/20 |
| 0443485 | 8/1991 | (EP) . | |
| 0478897 | 4/1992 | (EP) | B60R/21/16 |
| 0614786 | 9/1994 | (EP) | B60R/21/16 |
| 0619204 | 10/1994 | (EP) | B60R/21/20 |
| 0691245 | 1/1996 | (EP) . | |
| 691245 | 1/1996 | (EP) | B60R/21/20 |
| 0829396 | 10/1997 | (EP) | B60R/21/16 |
| 2192841 | 1/1988 | (GB) | B60R/21/16 |
| 2279046 | 12/1994 | (GB) . | |
| 5168043 | 6/1976 | (JP) | B60R/21/12 |
| 5214497 | 4/1977 | (JP) | B60R/21/12 |
| 5326888 | 8/1978 | (JP) | B60R/21/12 |
| 5326889 | 8/1978 | (JP) | B60R/21/12 |
| 5849541 | 3/1983 | (JP) | B60R/21/12 |
| 2279442 | 11/1991 | (JP) | B60R/21/12 |
| 5-85292 | 5/1993 | (JP) . | |
| WO9633886 | 10/1996 | (WO) | B60R/21/16 |
| WO 9634781 | 11/1996 | (WO) | B60R/21/16 |
| WO9710124 | 3/1997 | (WO) | B60R/21/16 |
| WO9712782 | 4/1997 | (WO) | B60R/21/16 |
| WO9728024 | 8/1997 | (WO) | B60R/21/16 |
| WO 9735745 | 10/1997 | (WO) | B60R/21/16 |
| WO9745296 | 12/1997 | (WO) | B60R/21/16 |
| WO9748580 | 12/1997 | (WO) | B60R/21/16 |

OTHER PUBLICATIONS

Adomeit, H–D: "Neue Methoden Und Neue Ziele Bei Der Entwicklung Von Insassen Schutzsystemem/New Methodology and New Targest In Development Of Occupant Protection Systems" ATZ Automobiltechnische Zeitschrift Bd. 97, Nr. 07/08 pp. 458–462 (with English translation blow–up of p. 459).

Airbags Are Everywhere: How Are They Doing?, by Carl E. Nash, Ph.D. 2nd International Akzo Symposium On Occupatnet Restraint Systems, Mar. 25–27, 1992, pp. 84–93 (English and German translations).

PAM–SAFE; Seminar Notes by Engineering Systems International, 8 pages, Jul. 1990.

* cited by examiner

AIR BAG FOLDING, PROCESS AND DEVICE FOR FOLDING AIRBAGS

FIELD OF THE INVENTION

The invention relates to airbag folding as well as to a method and device for folding airbags.

BACKGROUND OF THE INVENTION

In order to be able to stow the airbag of an airbag module in a steering wheel, or in the case of a passenger airbag module or side airbag module in the area of the dashboard or door, it is necessary to fold the airbag and press it into a container which is then closed. As well as other types of folding, there is one way of folding an airbag known from DE 44 22 276 A1 where the airbag has main folding lines which run at least in part along closed paths round an imaginary centre on the substantially empty spread out airbag. Folding the airbag down to the required packing density which is necessary for stowing the airbag in the steering wheel or on the dashboard is carried out so that in a first step folding is carried out along the said main folding lines and then this pre-folded airbag is folded or pressed, i.e. gathered up to the desired end shape through secondary fold lines which cross at least in part the main fold lines.

A device for producing this folding and gathering according to the said process preferably has a pot-like cylindrical part which can be inserted into the inflation opening of an airbag wherein the axial length of the cylindrical part corresponds at least approximately to the height of the airbag packet which is folded according to the first step. Furthermore a holding down member is provided which presses and holds the area of the airbag opposite the inflation opening on the bottom of the cylindrical socket part. Furthermore dish-like elements movable axially in the direction of the airbag are provided on opposite sides of the airbag and are arranged concentric with each other with different radii, with the radii of the opposing elements each being different.

Furthermore radial gathering elements are provided which can be brought together with the folded airbag into a packing device. A generator support can likewise be provided in this with the gas generator mounted in the support. The packing device furthermore has a device for pressing the folded airbag into the generator support.

If these folding, gathering and compacting elements are allotted known drives, e.g. pressure cylinders, then the cost of the drive is considerable.

SUMMARY OF THE INVENTION

The object of the invention is to provide a process and a device for rationally folding, gathering and compacting an airbag.

The airbag folding for an airbag used in an airbag module is characterized according to the invention in that the airbag is folded ring-shaped in the direction of an imaginary longitudinal axis wherein it has separate folds on the inside and on the outside of the ring. The imaginary longitudinal axis thereby preferably runs through the filling mouth of the airbag.

As opposed to the foldings known up until now, where the folds only run on the outer circumference of the folded airbag, the folding according to the invention represents a double folding where the airbag is folded again in addition directly adjoining the gas generator. This folding has the advantage that folding is produced free of rear cut sections which is important for the unfolding of the airbag and that only few method steps are required which can be carried out with a device which has few parts.

A further advantage is that the folding has an unfolding characteristic which is advantageous for the vehicle occupant. Thus during unfolding first only the inner or outer folds are stretched so that the airbag does not suddenly open fully in the direction of the occupant but full opening occurs with a slight time delay. This is designed so that on the one hand the occupant is not injured by the opening of the airbag whilst on the other hand the airbag does indeed open in good time to protect the occupant in the event of a crash.

A method for folding the airbag is designed according to the invention so that the empty airbag is stretched in the direction of a longitudinal axis running through the filling mouth and is gathered together within a boundary, preferably in a space with a ring-shaped cross-section in the direction of the longitudinal axis. Through stretching, the airbag is preshaped so that it obtains in rough strokes the circumference which it must have in the folded state in order to be stowed in a housing. Through the subsequent gathering which can take place for example through pressure action, the airbag then receives the height dimension which is required for stowing away the folded airbag. A rear-cut free folding is reached with this method without additional folding elements whereby this folding is called chaotic folding, i.e. the folds form naturally.

In one embodiment it is proposed that the spread out airbag is held in the area of its filling mouth and is drawn into a sleeve-shaped shaping body whilst at the same time an inner ram is introduced into the airbag and then the airbag is compressed in the sleeve-like shaping body by means of an outer ram. With this method the first significant step is a pulling process and the second significant step is a pressing process.

In another embodiment it is proposed that the spread out airbag is pressed through a ram into a sleeve-like shaping body and then is pressed in the direction of one end of the sleeve. Thus in this embodiment two pressing processes are carried out. As opposed to the embodiment described above here the spread out airbag in this embodiment requires no holder.

With first-mentioned embodiment of the process the spread out airbag is preferably both drawn into the shaping body and compressed from bottom to top. The airbag without a prefitted gas generator is thereby held in the spread out empty state at the filling mouth. When the gas generator is already fitted, the airbag is set in the spread out empty state on the gas generator.

In a further embodiment of the process it is proposed that the spread out airbag is held in its filling mouth area on an inner ram, that a sleeve-like shaping body is inverted over the airbag hanging down at the side of the ram and that then the airbag is compressed by means of an outer ram in the sleeve-like shaping body.

A device for folding an airbag is characterized in that a shaping body is provided, together with at least one device which stretches the airbag in a longitudinal axis running through the filling mouth and can introduce the airbag into the shaping body, as well as at least one device for compressing the airbag in the shaping body. In a preferred embodiment the shaping body is associated with a displaceable ram with smaller cross-section than the internal cross-section of the shaping body.

A sleeve is preferably provided as the shaping body. However a shaping body which is open on one or two sides can also be used.

A hollow cavity is provided between the displaceable ram and the shaping body and when using a sleeve as the shaping body the hollow cavity has a ring-shaped cross-section in which the airbag to be folded is introduced and compressed.

In a first embodiment a socket for the airbag is provided above the vertically mounted sleeve and can be inserted therein. Underneath the sleeve are two coaxial rams which can be inserted therein. The inner of the coaxial rams thereby represents the core for obtaining a ring-shaped hollow cavity whilst the outer ram is provided as a tool for compressing the airbag.

It is expedient if the inner contour of the shaping body corresponds to the outer contour of the folded airbag, that an inner ram is provided with an outer contour which matches the outer contour of a gas generator to be connected with the airbag, and that an outer ram is provided with an outer contour which corresponds to the inner contour of the shaping body.

The socket for the airbag or for the gas generator fixed on the airbag can be clamping tongs or a rod with foldable arm extensions.

In a further embodiment it is proposed that the shaping body formed as a sleeve is associated on one opening side with two rams which can be inserted coaxially into the sleeve whereby an inner ram has the outer contour of a gas generator which is to be attached to the airbag and whereby an outer ram has an outer contour which corresponds to the inner contour of the shaping body and that on the other opening side there is a ram which can be inserted into the shaping body and whose outer contour corresponds to the inner contour of the sleeve.

Also this sleeve is mounted preferably in the vertical direction so that the openings lie top and bottom. The two coaxial rams are thereby preferably mounted above the sleeve and the other ram is mounted underneath the sleeve.

In a further design of the device it is proposed that the shaping body is elastically deformable. With this design there is the additional advantage that only one shaping body which can be pressed by external elements into the required shape is required for the different cross-sectional shapes of the folded airbag which are necessary owing to the different forms of housings provided for different types of airbags.

In a further embodiment of the device an inner fixed ram is provided onto one end of which the airbag can be fitted in the region of its filling mouth. Furthermore a sleeve-like shaping body is provided which can be moved over the inner ram and the airbag held thereon and an outer ram is also provided which can be inserted with tight fit in the space between the inner ram and shaping body.

The shaping body is in this embodiment preferably movable from above over the inner ram and the outer ram is movable into the shaping body from below. Furthermore opposite the socket end of the inner ram for the airbag is a retaining ram which can be moved in the axial direction relative to the inner ram.

BRIEF DESCRIPTION OF THE DRAWINGS

The invention will now be explained in further detail with reference to the embodiments shown in the drawings in which.

DETAILED DESCRIPTION OF THE INVENTION

Figure 1:
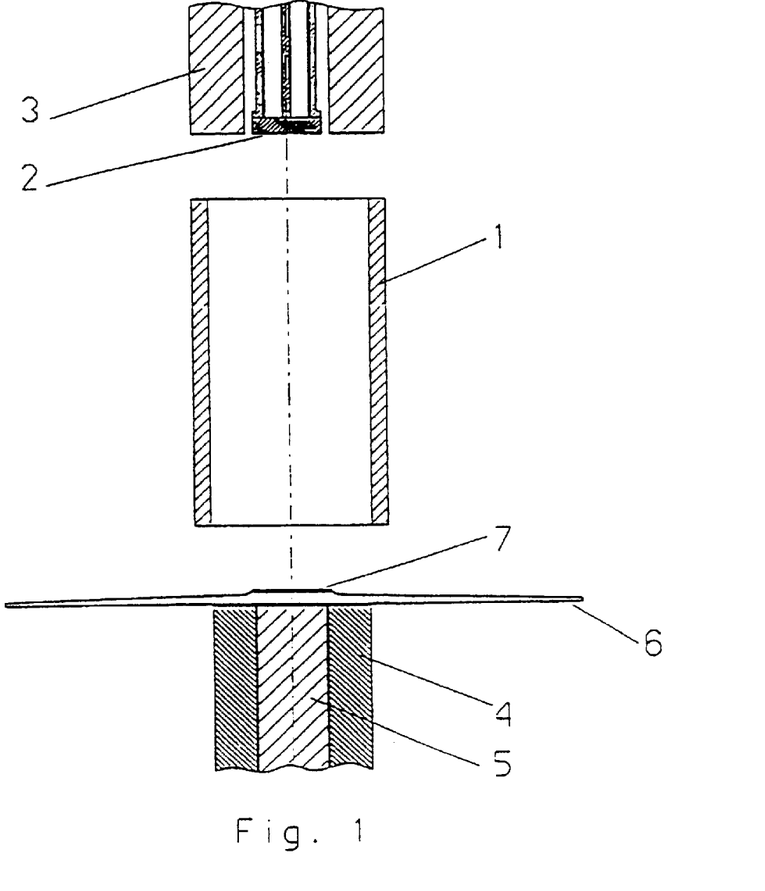
FIG. 1 shows the principle structure of a device according to the invention.
Figure 2:
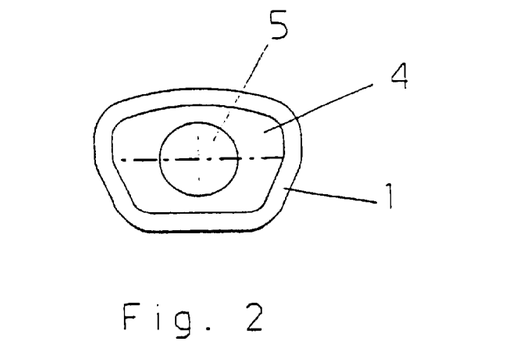
FIG. 2 is a plan view of the sleeve-like shaping body according to FIG. 1.

In a first embodiment illustrated in FIG. 1 the device has a sleeve 1 as a shaping body. Above the sleeve 1 are clamping tongs 2 insertable in the sleeve as a holder for the spread out airbag 6 as well as a stop 3 in the area of the clamping tongs 2. Underneath the sleeve are two coaxial rams 4, 5 which can be inserted in the sleeve. The outer contour of the outer ram 4 corresponds to the inner contour of the sleeve whilst the outer contour of the inner ram corresponds to the outer contour of the filling mouth 7 of the airbag or of the gas generator to be connected to same. The airbag 6 which is to be folded is laid down before the start of the folding process on the rams 4,5.

Figure 3A:
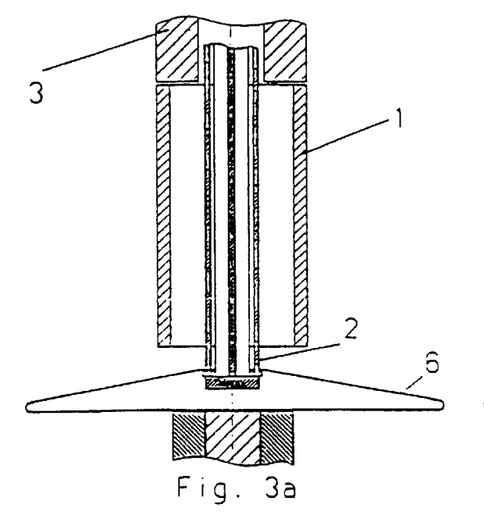
FIGS. 3a,b show the socket of the spread out airbag without and with prefitted gas generator.
Figure 3B:
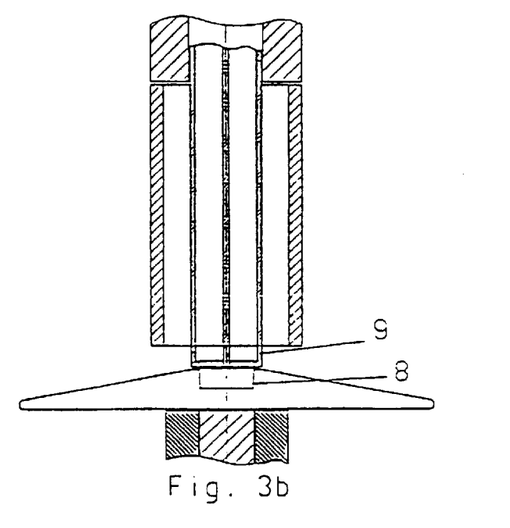

In a first method step, the stop 3 is moved up to the sleeve 1 and the clamping tongs 2 are pushed through the sleeve. In FIG. 3a the clamping tongs are formed for holding the airbag without the gas generator. They are inserted into the mouth 7 of the airbag 6 and then spread out. In FIG. 3b the airbag 6 is already provided with a gas generator 8. In this case the air bag is held on the gas generator 8 by the clamping tongs 9 which are modified relative to FIG. 3a. Further description of the method relates to the use of the clamping tongs 2.

Figures 4, 5A:
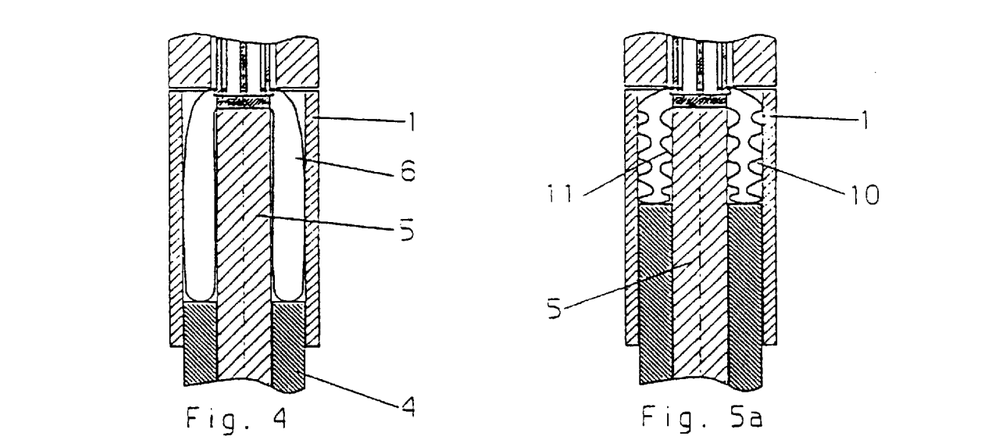
FIG. 4 shows the pre-shaping of the airbag in the shaping body.
FIGS. 5a,5b show a folding plan for the airbag during compression and after compression.
Figure 5B:
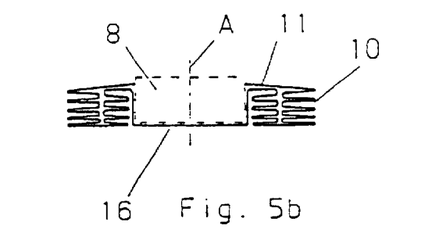

The airbag 6 is drawn by the clamping tongs 2 into the sleeve 1 whereby at the same time the inner ram 5 is pressed upwards so that the airbag 6 is preformed inside a ring space as shown in FIG. 4. The outer ram 4 is then pushed upwards whereby the airbag is pressed upwards inside the ring space between the inner ram 5 and the sleeve 1. FIG. 5a shows the intermediate stage of the folding which is thereby reached. It can be seen that a double folding takes place since the airbag is placed both in folds 10 against the sleeve 1 and in folds 11 against the ram 5. The end stage of folding is shown in FIG. 5b. It can be seen that the folds are free of rear-cut sections which is essential for a complete unfolding. On the other hand however there is no sudden unfolding of the airbag forwards in the direction of the occupant since after ignition of the gas generator first the inner folds 11 unfold forwards and only then do the outer folds 10 unfold.

Figure 6:
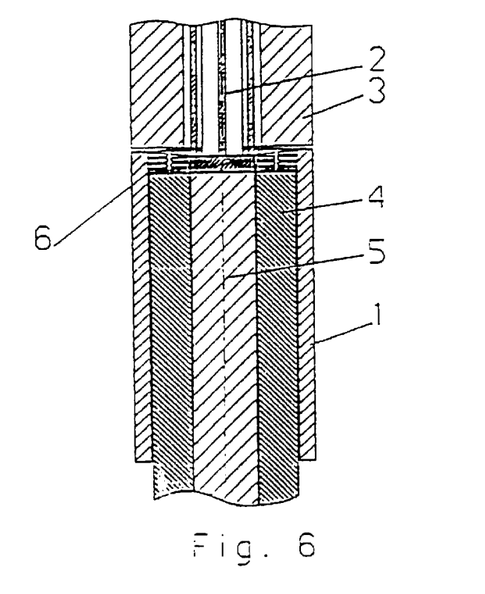
FIGS. 6–8 show the insertion of the folded airbag in a housing.
Figure 7:
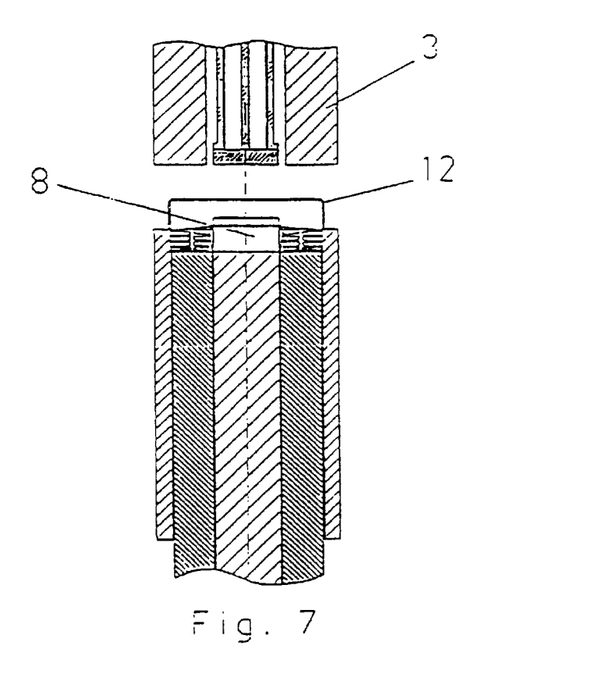
Figure 8:
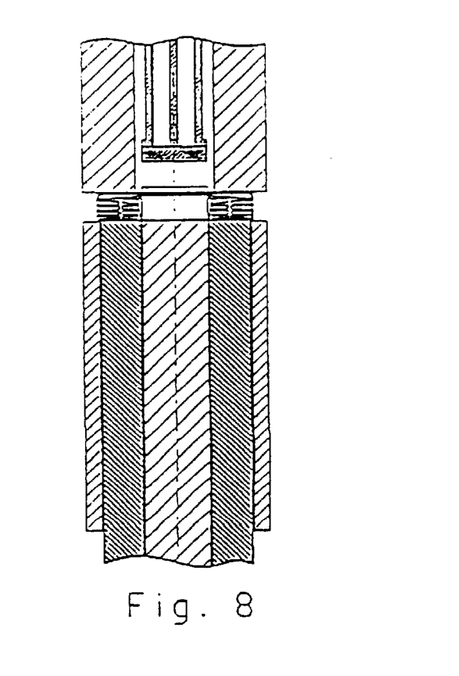
Figure 9:
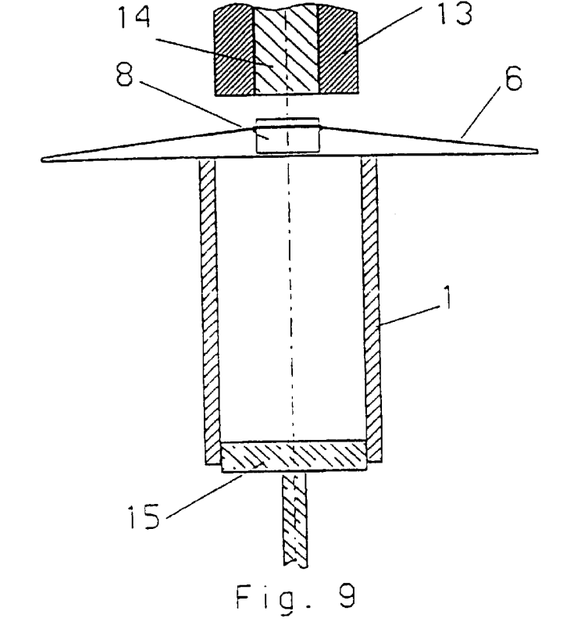
FIGS. 9–14 show the folding process by means of a second embodiment of a device.

At the end of the folding process both rams 4, 5 are located in an upper position (FIG. 6) in which they still lie beneath the upper edge of the sleeve 1. The clamping tongs 2 are now relaxed and withdrawn from the mouth of the airbag. Furthermore the stop 3 is lifted and then the gas generator 8 is connected to the airbag and a housing 12 is placed on the top edge of the sleeve 1 (FIG. 7). The housing is held by the stop 3 and the airbag is pressed into the housing by means of the rams 4,5 (FIG. 8).

A further embodiment of the device and a modified method sequence connected therewith are shown in FIGS. 9 to 14. This device likewise has a sleeve 1. Above the sleeve are an outer ram 13 and an inner ram 14. The contour of the outer ram 13 corresponds to the inner contour of the sleeve 1 and the contour of the inner ram 14 corresponds to the contour of the mouth or gas generator 8. A ram 15 is provided at the lower opening of the sleeve 1 and its contour corresponds to the inner contour of the sleeve 1.

Figure 10:
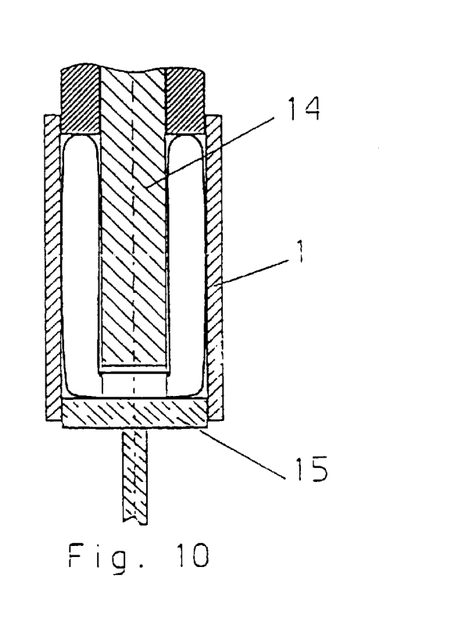
Figure 11:
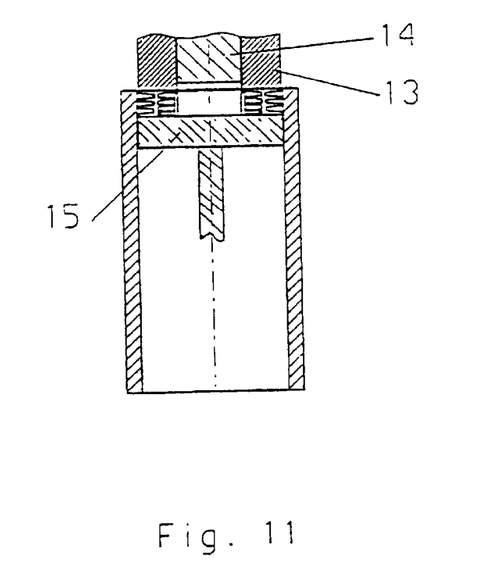

The airbag 6 lying on the sleeve 1 is first pushed into the sleeve 1 by the inner ram 14 whereupon the sleeve 1 is then closed at the bottom by the ram 15. The airbag is thereby preformed as in the preceding embodiment in a space with ring-shaped cross-section in the direction of the longitudinal axis of the sleeve.

Folding the airbag can now be carried out in two different ways. According to FIG. 11 the airbag is pushed by the ram 15 upwards against the ram 13 whereby the ram 14 is moved upwards as well at the same time.

Figure 12:
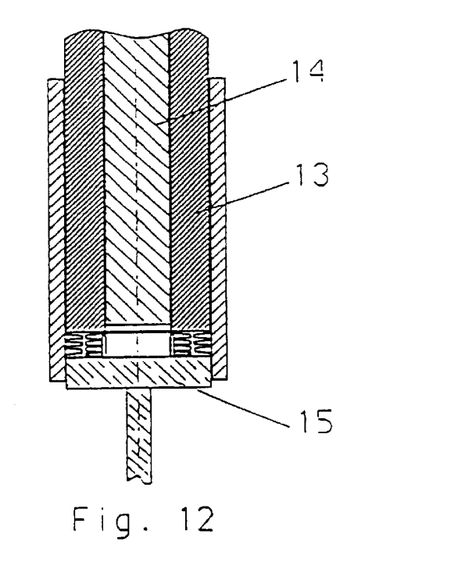

With the variation in FIG. 12 the rams 14 and 15 remain in their lower position and the airbag is compressed and thereby folded by means of the outer ram 13.

Figure 15:
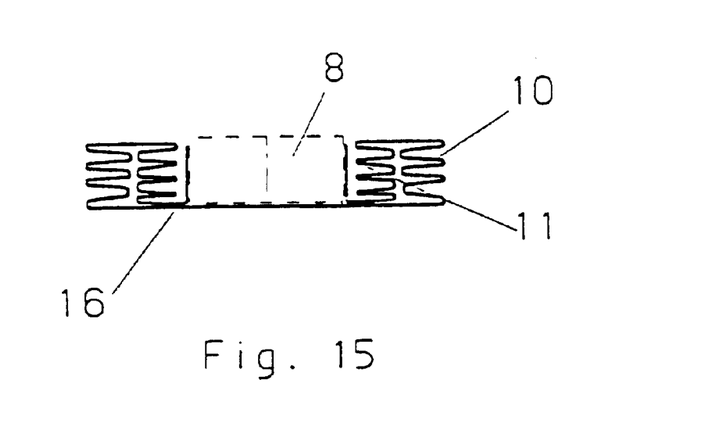
FIG. 15 shows the folding plan of an airbag after compression by means of the second embodiment of the device.

In both cases, as in the previous embodiment, a double folding is achieved wherein only the smooth layer 16 which rests on the gas generator 8 changes into the outer folds 10 whilst in the case of the previous embodiment as shown in FIG. 5b it changes into the inner folds 11. Thus with the folding plan in FIG. 15 first the outer folds 10 are unfolded whereby the same advantages exist as with the folding plan in FIG. 5b.

Figure 13:
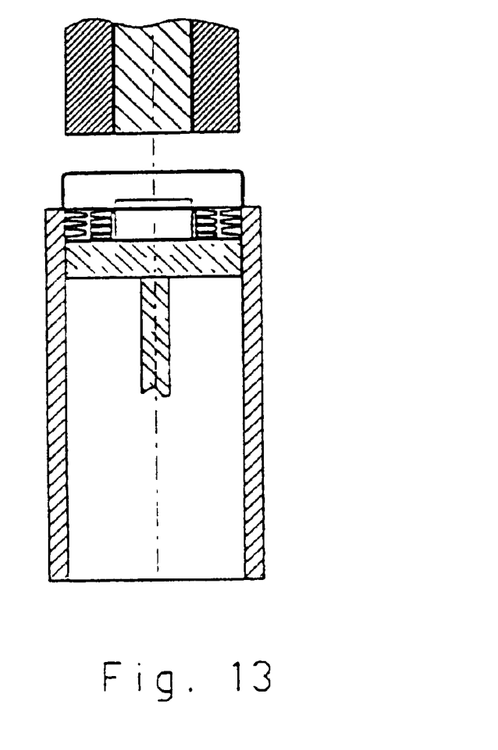
Figure 14:
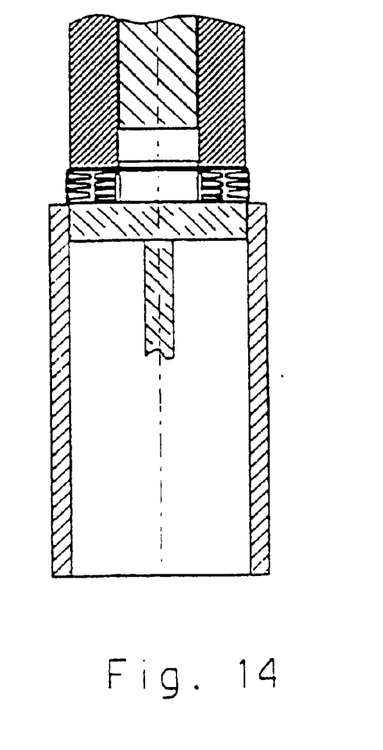

At the end of folding, the housing is fitted similar to the previous embodiment and the airbag is pressed by the ram 15 into the housing (FIGS. 13 and 14).

Figure 16:
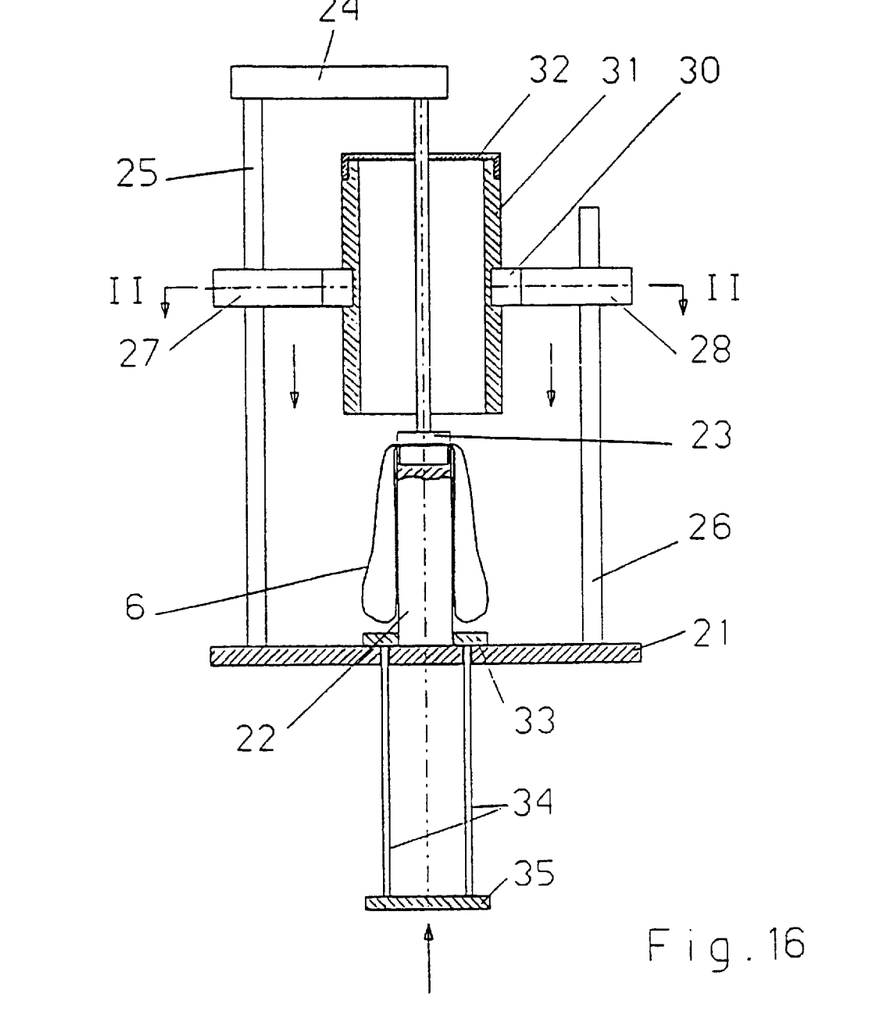
FIG. 16 shows an embodiment of the device with a fixed ram.
Figure 17:
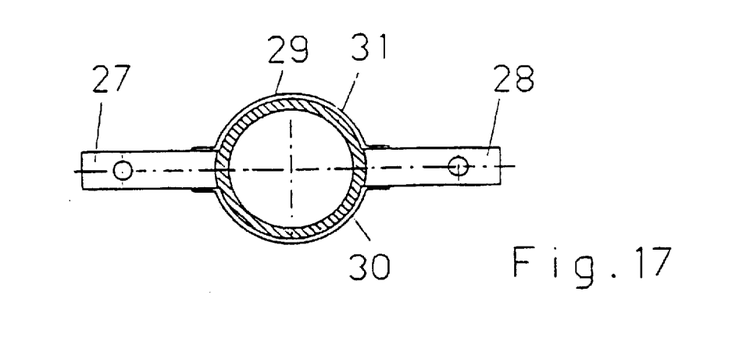
FIG. 17 shows a cross-section according to the line II—II of FIG. 16.

With the embodiment of FIG. 16, a fixed inner ram 22 is provided on a work table 21 of the device and the airbag 6 to be folded is placed with its filling mouth on the upper end face of this ram. A retaining ram 23 is provided over the end face and airbag and is fixed on a cross bar 24 which is connected to the work table by a guide column 25. The retaining ram 23 is movable slightly up and down so that the airbag 6 can be placed on the inner ram 22 and can then be fixed by bringing up the retaining ram.

Furthermore arms 27 and 28 are provided which are movable on the guide column 25 or on a further guide column 26. A sleeve-like shaping body 31 is fixed on these arms by means of clips 29, 30 and is positioned concentric with the retaining ram 23 and closed at the top by a screw-on cover 32. The shaping body can be moved down from the position shown in FIG. 16.

A ring 33 is mounted as an outer ram concentric with the inner ram 22. This ring is fixed on four rods 34 projecting through the work table 21 and held in a plate 35. The ring 33 is displaceable upwards from the position shown in FIG. 16.

Before fitting an airbag into the device the inner ram 22 and retaining ram 23 are moved so far away from each other when the retaining ram is moved upwards that an airbag can be placed in the empty spread out state on the inner ram 22. After placing the airbag in position the retaining ram is moved down onto the airbag 6 to fix same.

Owing to the lack of side support the airbag hangs down at the inner ram as shown in FIG. 16. In a next step the shaping body 31 is moved down until the cover 32 adjoins the airbag in the area where it is clamped. The airbag 6 is now located between the inner ram 22 and the shaping body 31.

In a next step the ring 33 is moved upwards whereby the airbag 6 is folded. At the end of the folding process first the shaping body 31 is moved upwards and then the retaining ram 23 until there is sufficient space above the folded airbag to fit a housing (not shown) into which the folded airbag is then pressed from below by the ring 33.

What is claimed is:

1. A method for folding an airbag for an airbag module, the airbag having a filling mouth, the method comprising, spreading out an empty airbag and holding the empty airbag at its filling mouth, stretching the empty airbag along a longitudinal axis running through the filling mouth to provide a stretched out empty airbag, providing an outer boundary surface, locating the outer boundary surface and the stretched out empty airbag relative to each other such that the stretched out empty airbag is located inside the outer boundary surface, and gathering the stretched out empty airbag inside the outer boundary surface along the longitudinal axis, wherein stretching includes drawing the spread out empty airbag into a sleeve-like shaping body that forms the outer boundary surface and at the same time introducing an inner ram into the airbag, wherein gathering includes compressing the airbag in the sleeve like shaping body with an outer ram after introducing the inner ram into the airbag.

2. The method according to claim 1, wherein the spread out airbag is both drawn into the shaping body and compressed therein from a first end of the shaping body to a second end of the shaping body.

3. A method for folding an airbag for an airbag module, the airbag having a filling mouth, the method comprising, spreading out an empty airbag, stretching the empty airbag along a longitudinal axis running through the filling mouth to provide a stretched out empty airbag, providing an outer boundary surface, locating the outer boundary surface and the stretched out empty airbag relative to each other such that the stretched out empty airbag is located inside the outer boundary surface, and gathering the stretched out empty airbag inside the outer boundary surface along the longitudinal axis, wherein stretching includes pressing the spread out empty airbag into a sleeve like shaping body that forms the outer boundary surface through a first ram, wherein gathering includes compressing the airbag with a second ram toward one end of the sleeve like shaping body, the second ram having an outer contour that corresponds to an inner contour of the sleeve like shaping body that forms the outer boundary surface.

4. A method for folding an airbag for an airbag module, the airbag having a filling mouth, the method comprising, spreading out an empty airbag and holding the empty airbag at its filling mouth on an inner ram such that the airbag hangs down at a side of the ram to provide a stretched out empty airbag, providing an outer boundary surface, locating the outer boundary surface and the stretched out empty airbag relative to each other such that the stretched out empty airbag is located inside the outer boundary surface, and gathering the stretched out empty airbag inside the outer boundary surface along the longitudinal axis, wherein locating includes inserting a sleeve like shaping body that forms the outer boundary surface over the airbag hanging down at the side of the ram, wherein gathering includes compressing the airbag in the sleeve like shaping body by an outer ram after inserting the shaping body.

5. The method according to claim 3, wherein the airbag is an airbag without a prefitted gas generator.

6. The method according to claim 3, wherein the airbag includes a prefitted gas generator and further comprising spreading out the empty airbag and holding the empty airbag at the prefitted gas generator of the airbag.

7. A device for folding an airbag having a filling mouth, comprising:
- a sleeve provided as a shaping body;
- a stretching device which holds the airbag and stretches the airbag in a longitudinal axis running through the filling mouth and into the shaping body;
- a compressing device that compresses the airbag in the shaping body; and
- a holder for the airbag provided above the sleeve and insertable therein and two coaxial rams provided underneath the sleeve and insertable therein.

8. A device for folding an airbag having a filling mouth, comprising:
- a shaping body;
- a stretching device which holds the airbag and stretches the airbag in a longitudinal axis running through the filling mouth and into the shaping body; and
- a compressing device that compresses the airbag in the shaping body;
- wherein the shaping body includes an inner contour that corresponds to an outer contour of an airbag folded in the device and further comprising an inner ram provided with an outer contour which corresponds to an outer contour of a gas generator which is to be connected to the airbag and an outer ram provided with an outer contour which corresponds to the inner contour of the shaping body.

9. The device according to claim 8, wherein clamping tongs or a rod with foldable extension arms are provided as a holder for the airbag or for a gas generator fixed on the airbag.

10. The device according to claim 8, wherein the shaping body is elastically deformable.

11. A device for folding an airbag having a filling mouth, comprising:
- a sleeve provided as a shaping body;
- a stretching device which holds the airbag and stretches the airbag in a longitudinal axis running through the filling mouth and into the shaping body; and
- a compressing device that compresses the airbag in the shaping body;
- wherein the shaping body formed as a sleeve includes a first opening side and a second opening side, the device further comprising two rams that are insertable coaxially in the first opening side, wherein an inner ram of the two rams has an outer contour of a gas generator to be attached to the airbag and wherein an outer ram of the two rams has an outer contour which corresponds to an inner contour of the sleeve, and a third ram is provided which is insertable in the second opening side of the sleeve and whose outer contour corresponds to the inner contour of the sleeve.

12. The device according to claim 11, wherein the sleeve is mounted in a vertical direction and the two rams are mounted above the sleeve and the third ram is mounted underneath the sleeve.

13. A device for folding an airbag having a filling mouth, comprising:
- a sleeve provided as a shaping body;
- a stretching device which holds the airbag and stretches the airbag in a longitudinal axis running through the filling mouth and into the shaping body;
- a compressing device that compresses the airbag in the shaping body; and
- an inner fixed ram attachable to the airbag at its filling mouth area, wherein the sleeve is moveable over the inner ram to define a space between the inner ram and shaping body to receive the airbag when the airbag is held thereon, and further comprising an outer ram that is insertable with tight fit into the space between the inner ram and shaping body.

14. The device according to claim 13, wherein the shaping body is mounted in a vertical direction, and is moveable toward the inner ram from above, and wherein the outer ram is moveable into the shaping body from below.

15. The device according to claim 13, wherein the inner fixed ram is attachable to the airbag at a socket end and further comprising a retaining ram opposite the socket end of the inner ram for the airbag that is movable axially relative to the inner ram.

* * * * *